Oct. 19, 1954  E. G. DUERINGER ET AL  2,691,959
SELF-FEEDING SILO
Filed Sept. 17, 1952  3 Sheets-Sheet 1

INVENTORS:
Wesley G. Martin
BY Erwin G. Dueringer

ATTORNEYS.

Oct. 19, 1954     E. G. DUERINGER ET AL     2,691,959
SELF-FEEDING SILO
Filed Sept. 17, 1952     3 Sheets-Sheet 2
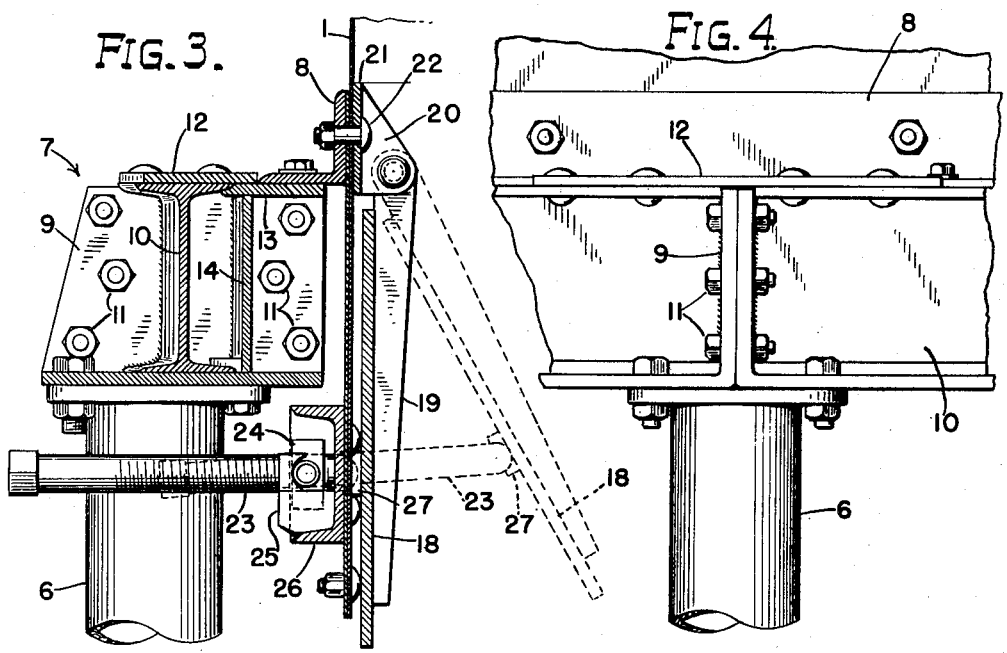
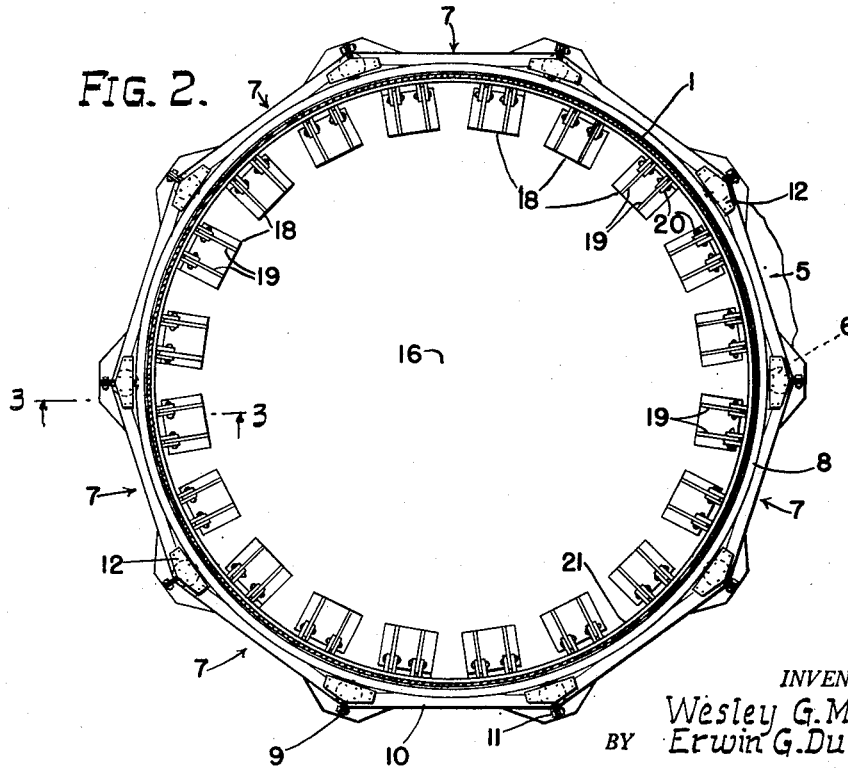
INVENTORS:
Wesley G. Martin
BY Erwin G. Dueringer
Andrus & Scealer
ATTORNEYS.

Oct. 19, 1954  E. G. DUERINGER ET AL  2,691,959
SELF-FEEDING SILO
Filed Sept. 17, 1952  3 Sheets-Sheet 3
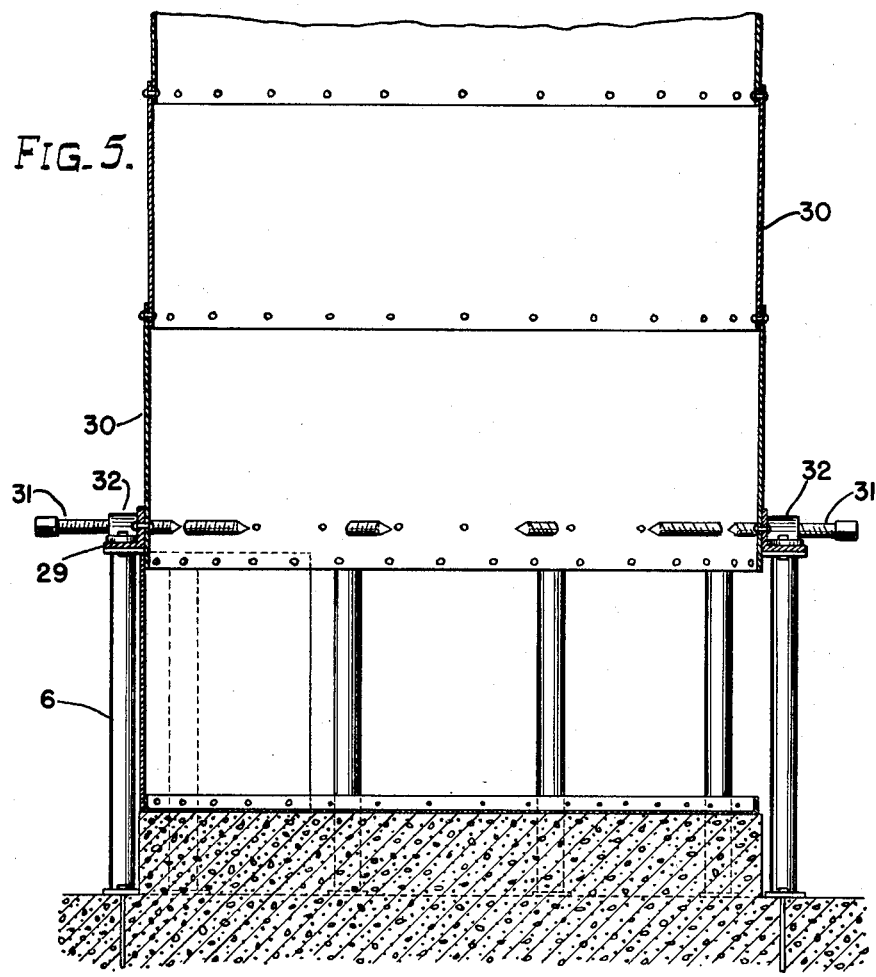
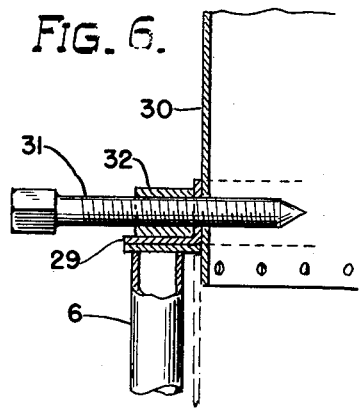
INVENTORS:
Wesley G. Martin
BY Erwin G. Dueringer
Andrus & Scales
ATTORNEYS.

Patented Oct. 19, 1954

2,691,959

UNITED STATES PATENT OFFICE 2,691,959

SELF-FEEDING SILO

Erwin G. Dueringer and Wesley G. Martin, Milwaukee, Wis., assignors to A. O. Smith Corporation, Milwaukee, Wis., a corporation of New York Application September 17, 1952, Serial No. 310,092

5 Claims. (Cl. 119—52)

1

This invention relates generally to so-called self-feeding silo structures and particularly to means attached to the silo with which downward flow of the silage in the structure can be controlled as the feeding animals remove the lower portion of the silage at their feeding stations adjacent the bottom of the silo.

Considerable difficulty has been encountered in silo structures of the above type in that a particular cross-sectional area of the column of silage may tend to exert a great deal of pressure on a small sector or sectors of the base, thereby compacting the silage to such a degree, that in some instances it is very difficult for the animals to bite into the silage. Tests have disclosed that once this compacting tendency of the silage has begun, it becomes progressively worse, making it ultimately necessary for the operators to exert an extreme amount of pressure to remove the compacted silage and to re-establish a uniform flow of the feeding material. In some cases resort has been had to the use of dynamite, a pick ax, or to a bulldozer to break up the compacted silage.

It is an object of this invention to control the downward flow of the column of silage or the like in a self-feeding storage structure so that there will be little if any likelihood of uncontrolled flow of silage which would result in compacting the column in one or perhaps more spots at the base of the silo.

Another object is to provide self-feeding silo incorporating means which are capable of exerting pressures at various points adjacent the bottom of the column of silage stored therein, whereby the vertical alignment of the silage column with respect to the wall of the silo may be adjusted to permit the desired downward passage of the column without exerting undue or uneven pressure on the wall of the silo and consequently to cause misalignment of the column of silage within the silo.

A further object is to provide a self-feeding silo having adjustable control plates mounted adjacent the bottom of the silo which may be manipulated to regulate the downward flow of various portions of the silage column to thereby provide a uniform amount of silage to be available throughout the plurality of feeding stations located at the bottom of the silo.

Briefly the invention comprises a vertically disposed silo adapted to be open at the bottom end during feeding therefrom, so that animals may feed themselves from silage stored within the silo. Adjacent the open end of the silo the latter is provided with adjustable means, such

2 as a plurality of plates, rods or screws which are adjustable toward the interior of the silo to contact the silage and thereby regulate the downward flow of the silage onto the silo foundation from which the animals feed.

Other objects of the invention will appear hereinafter in connection with the following description of the drawings in which:

Fig. 2 is a sectional view taken on line 2—2 of Fig. 1 with the plates all adjusted inwardly;

Fig. 3 is an enlarged sectional view taken on line 3—3 of Fig. 2 showing the detailed construction of the control plates.

Fig. 4 is an enlarged fragmentary elevation showing the attachment of the body of the silo to the supporting posts;

Fig. 5 is a vertical section of a silo showing a second embodiment of the invention in which adjustable screws are used in place of the control plates.

Fig. 6 is an enlarged detail view of one of the adjustable screws illustrated in Figure 4.

Figure 1:
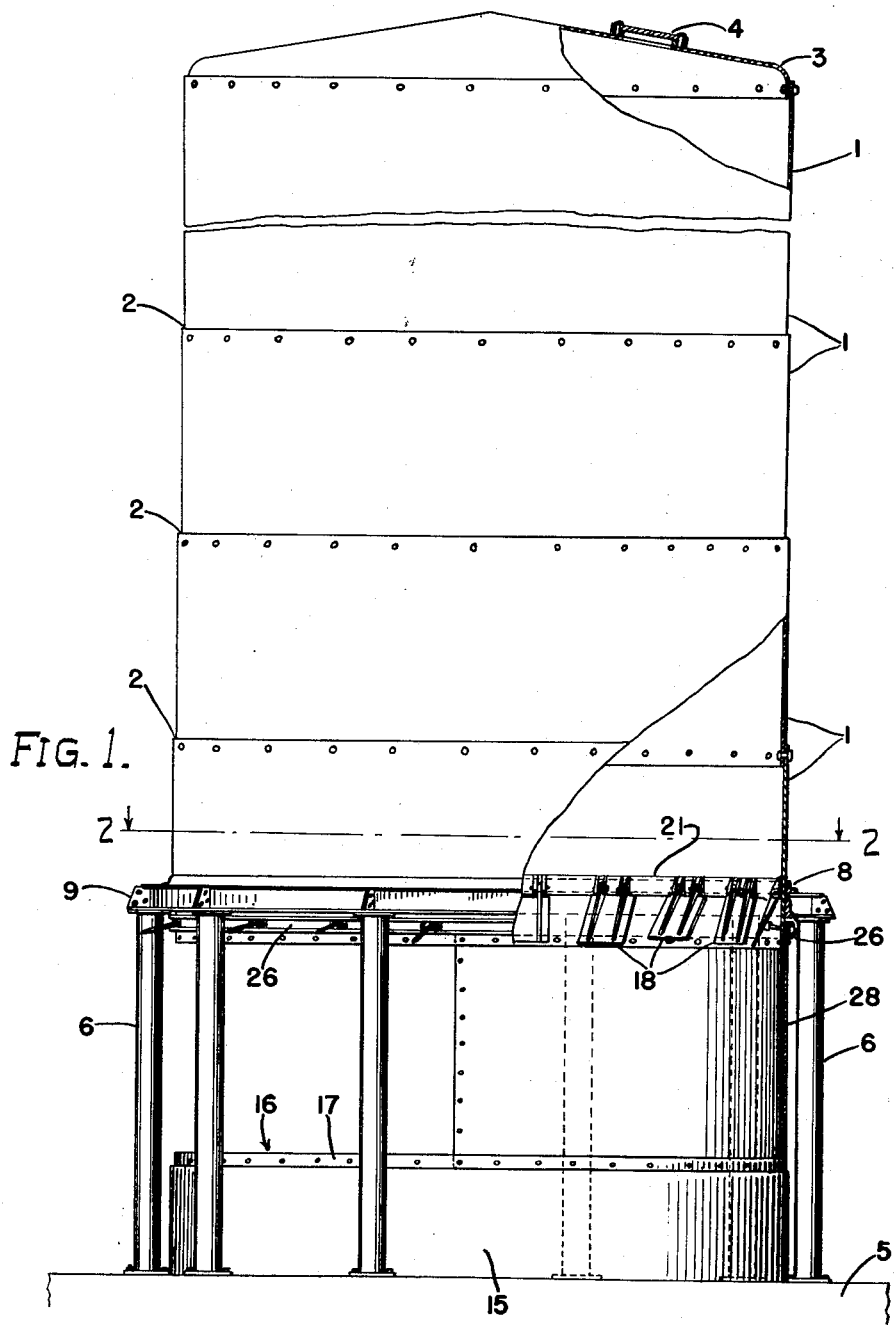
Figure 1 is a vertical elevation view, partly in section, of a silo and showing the adjustable plates of the invention in various positions and with a portion of the paneling between the silo and foundation located in place.

With reference to the drawings the silo illustrating the invention comprises a plurality of cylindrical metal sections 1 which are disposed one on top of the other and secured together at joints 2. A roof 3 closes the top of the silo.

The several sections are of suitable gauge metal and the sections together with the cover are preferably coated with ceramic enamel, not shown, to protect the metal from corrosion. The joints 2 are sealed with a suitable sealing material to prevent the leakage of air, water or the like therethrough.

An opening is located within roof 3 for filling the silo from the top and the opening is closed by a door 4 when the silo has been filled.

The series of cylindrical metal sections 1 are spaced upwardly from the foundation 5 so that the cattle may feed out of the bottom of the structure and are supported by a plurality of circumferentially spaced posts 6 which rest on the outer annular portion of foundation 5.

Posts 6 are spaced outwardly of sections 1 and are connected to the lowermost of sections 1 by a plurality of generally straight connecting segments 7 which extend between adjacent posts 6 and are attached to an angle-shaped ring 8 which is secured to the outer surface of the lowermost section 1.

Each of the segments 7 consists of a pair of radially extending angle-shaped end plates 9 which are connected by an I-beam 10. End plates 9 rest on the flanged upper end of posts 6 and, the end plates of each segment are disposed in a back-to-back relation with the end plates of adjacent segments and secured thereto by bolts 11. Additional attachment between adjacent segments 7 is provided by tie plates 12 which connect the I-beams 10 of the adjacent segments.

To connect segments 7 to ring 8, the lower flange of ring 8 is secured by suitable bolts to a series of plates 13 which extend between end plates 9 of each segment, inwardly of I-beams 10. Added support is given to plates 13 by vertical ribs 14.

The lower flange of each post 6 is bolted to foundation 5. Posts 6 thus rigidly support the silo on foundation 5 and sufficient space is available between the posts for livestock to feed from the silage stored in the structure. Foundation 5, which is of concrete or the like, normally has the top of the outer annular portion to which posts 6 are secured at grade level, and of a diameter greater than that of the silo. However, the central portion 15 of the foundation that lies under the silo proper and on which the silage rests is of substantially the same diameter as that of the silo. Central portion 15 of the foundation is of a height sufficient to make it comfortable for cattle to remove silage from the top surface thereof, which, under the provisions of the structure of this invention, will permit a uniform downward flow of silage from the silo.

In addition central portion 15 is provided with a circular tray 16 having a peripheral upstanding flange 17 for confining and holding the silage on the foundation.

In order to brake the downward movement of the silage or other stored material the lower end of the storage structure is provided with a plurality of circumferentially spaced control or brake means. These brake means may take a number of forms.

In the embodiment of the invention illustrated in Figures 1, 2 and 3, the brake means comprises plates 18 of a generally rectangular shape.

A pair of spaced ribs 19 are secured edgewise to the inner face of each plate 18 and the upper end of each rib 19 is pivotally secured between a pair of angle lugs 20. Lugs 20 are welded to a ring 21 inside the silo wall and attached to the upstanding flange of ring 8 by the bolts 22.

Each plate is operated by a threaded rod 23 which is square on the outer end for engagement by a suitable tool for manipulation in service. Rod 23 is threaded through a nut 24 that is trunnioned within brackets 25 secured edgewise to the web portion of a channel-shaped ring 26 which extends around the structure slightly below ring 21 and is suitably secured to the lowermost of the sections 1.

The inner end of rod 23 is round and rests in a complementary socket in a bearing member 27 which is secured generally centrally to the back of plate 18. As rod 23 is threaded inwardly through nut 24 against the respective bearing member 27 of plate 18 the plate is pivoted inwardly and the trunnioned nut 24 swings sufficiently to retain the end of rod 23 seated in bearing member 27. Figure 3 illustrates the outer position of one of the plates 18 in full and an inward position in dotted lines. Rod 23 can be fed outwardly until the control plate 18 hangs vertically in line with lowermost section 1 thereby affording free flow of the silage downwardly. When the plates are in vertical position there should be sufficient clearance between them and the foundation to permit cattle to walk in between posts 6 and feed upwardly into the column of silage without hindrance from the plates.

To completely enclose the silage and prevent spoilage when the self-feeding structure is not in use, a cylindrical skirt 28 may be attached between the lowermost of the sections 1 and the upstanding flange 17 of tray 16. The skirt 28 is preferably composed of a number of arcuate segments, any or all of which may be readily secured to the structure to obtain any feeding arrangement or to completely enclose the silage, as desired.

Figure 1 illustrates some of the control plates 18 adjusted to different positions. This merely illustrative disposition of the control plates indicates that the column of silage is flowing more freely downwardly in those areas where the plates are not adjusted inwardly. By adjusting inwardly a single control plate 18, or a plurality of the control plates 18 on one side to a greater degree than their counterparts on the other side a braking action is affected on that particular portion of the column of silage directly above the plates, while on the other hand the portion of the column of silage above the outwardly adjusted plates is free of the braking action and is permitted to pass or flow downward freely.

It is desirable that the column of silage remain at all times as nearly vertical with respect to the inner foundation as is possible. In the event that the operator discovers that this condition does not exist and this may be determined by inspecting the relative compactness of the silage at various points about the inner foundation from which the animals feed, the operator may adjust certain of the control plates to shift the column so that it becomes vertical. As an example, if it is noted that the silage adjacent the left side of a silo such as that shown in Figure 1 is beginning to compact it may indicate that the column has begun to move slowly toward the left side of the silo. By adjusting certain of the control plates on that particular side of the silo inwardly, to a greater degree than the control plates on the right-hand side of the silo, the base of the column of silage adjacent the control plates may be shifted to bring the column into alignment with the vertical axis of the silo.

Figures 5 and 6 illustrate another embodiment of the invention. Posts 6 are secured at the lower end to the foundation as previously described and at the upper end are bolted to the annular right angle shaped ring 29 in turn suitably secured to cylindrical wall 30 of the silo. At spaced intervals around the structure screws 31 are threaded through bearing members 32 secured to ring 29 and extend through the upstanding flange of ring 29 and wall 30 of the silo into engagement with the material which may be stored in the structure.

The inner ends of screws 31 are provided with sharp points while the outer ends are preferably shaped to receive a wrench for turning the bolts into or out of their threaded bearings 32. The screws are preferably of substantial diameter and length because first of the necessity of withstanding substantial pressure from the silage, and secondly because it is desirable that the bolts be capable of being fed inwardly into the mass of silage for a substantial distance.

In the event that the column of silage feeds downwardly too rapidly at any particular spot or spots the bolts which are disposed adjacent these positions may be fed inwardly into the column of silage. The flow of the descending silage will be retarded not only by the bolts which extend into the silage but also by the fact that the silage will tend to build up on the bolts thereby causing further retardation to movement of the column.

On the other hand, if the rate of flow of the silage becomes too slow at any particular spot or spots the bolts may be fed outwardly to decrease resistance to movement of the column. The bolts may also be used to shift the movement of the column of silage in a like manner to that described above in connection with the pivotally mounted control plates 18.

When the silo is being filled with forage crops the control plates or the bolts are both fed inwardly as far as possible, also during filling, the lower portion of the structure inside posts 6 is preferably closed with panels. The stored material is thus kept in a substantially airtight silo, until it is desired to feed out of the silo, in order to better preserve the silage or whatever material it may be. When feeding from the structure begins, the panels are first removed and the cattle to be fed are permitted to eat from the lower part of the column of silage.

Observation of the movement of the column around the circumference thereof will indicate whether the column is traveling downwardly too fast in any particular place or places. If this happens the control plates adjacent these spots are adjusted inwardly or the bolts are fed inwardly to retard movement as desired. Likewise, if observation indicates that the downwardly moving column is compacting in any particular place or places, the control plates or bolts above described may be manipulated to shift the column so that a free flow may be obtained.

The above described invention provides a relatively simple and economical way to control the flow of silage in a self-feeding silo and the means provided to accomplish the desired purposes may be quickly and easily manipulated by an operator from ground level.

Various embodiments of the invention may be employed within the scope of the following claims.

I claim:

1. A storage structure for the storage of forage crops from which animals may self-feed which comprises a vertically disposed silo having the bottom thereof adapted to be open to permit animals to feed from the crops stored therein, a foundation for said silo, an inner foundation rising from said first named foundation and adapted to receive silage from the silo, a plurality of supports extending between the first named foundation and the open end of the silo and being circumferentially spaced radially outside the inner foundation and integrally secured to the first foundation and the lower end of the silo, an annular ring securing the upper ends of the supports together, circumferentially spaced control plates pivotally secured at their upper edges to the lower end portions of the structure and said annular ring adjacent the upper ends of said supports, and means to pivot the control plates to adjusted positions to engage the silage and transmit the load of the silage to said supports and thereby regulate the downward flow of silage from the silo to the inner foundation.

2. A storage structure for the storage of forage crops from which animals may self-feed, which comprises a foundation, a plurality of superimposed cylindrical metal sections joined together and closed at the top and the lowermost section being vertically spaced from the foundation, an annular ring secured to the outer and lower surface of the lowermost section, a plurality of circumferentially spaced posts secured to said foundation and to the annular ring to support the silo on the foundation, circumferentially spaced control plates secured at the upper end to a lower metal section of the structure and said annular ring and depending downwardly therefrom, said plates being adapted to pivot into and away from the interior of the structure, a second annular ring secured to said lower metal section below the first named ring, circumferentially spaced nuts trunnioned in brackets secured to the second annular ring behind each control plate, and adjusting rods threaded through said nuts and bearing against the back of each plate to move the plate when threaded inwardly or outwardly toward or away from the silage to regulate the downward flow of silage and to shift the column of silage within the silo to permit free flowage downwardly thereof.

3. A storage structure for the storage of forage crops from which animals may self-feed which comprises a vertically disposed silo having the bottom thereof adapted to be open to permit animals to feed from the crops stored therein, a foundation for said silo, a plurality of circumferentially spaced supports disposed between the open end of the silo and the foundation and secured to the lower end of the silo and to the foundation, circumferentially spaced nuts secured to the lower portion of the silo and to said supports, and a threaded bolt having a pointed end threaded through each nut and adjustably extending through circumferentially spaced openings in said silo, said bolts being adapted to variably pierce the column of silage with the load of the silage taken by said bolts being transmitted to the supports to regulate the downward flow of various vertical portions of the silage from the silo to the foundation and maintain a vertical column of silage with respect to the foundation.

4. A storage structure for the storage of forage crops from which animals may self-feed, which comprises a vertically disposed silo having the bottom thereof adapted to be open to permit animals to feed from the crops stored therein, a foundation for said silo, a plurality of circumferentially spaced supports disposed between the open end of the silo and the foundation and integrally secured to the silo and said foundation, means securing said supports together, a plurality of circumferentially spaced silage support means secured to the lower end of the silo and to said means securing said supports together, and means operatively associated with the support means to effect movement of said support means inwardly of the silo and against said silage to support the silage on said supports and regulate the downward flow of silage from within the silo to the foundation.

5. A storage structure for the storage of forage crops from which animals may self-feed, which comprises a vertically disposed silo having the bottom thereof adapted to be open to permit animals to feed from the crops stored therein, a foundation for said silo, a plurality of circumferentially spaced supports disposed between the open end of the silo and the foundation and integrally secured to the silo and said foundation, means securing said supports together, and a plurality of circumferentially spaced plates pivoted at their respective upper ends to the lower end of the silo and to the means securing the supports together, said plates being adapted to be adjusted inwardly of the silo and against said silage to support the silage on said supports and regulate the downward flow of silage from within the silo to the foundation.

References Cited in the file of this patent

UNITED STATES PATENTS

| Number | Name | Date |
|---|---|---|
| 1,301,051 | Hart | Apr. 15, 1919 |
| 1,693,612 | Mabee | Dec. 4, 1928 |
| 2,638,871 | Ruedemann | May 19, 1953 |